(12) United States Patent
Kim et al.

(10) Patent No.: US 12,188,672 B2
(45) Date of Patent: Jan. 7, 2025

(54) METHOD FOR CONTROLLING AIR CONDITIONING DEVICE BASED ON DELAYED REWARD

(71) Applicants: MakinaRocks Co., Ltd., Seoul (KR); Hanon Systems, Daejeon (KR)

(72) Inventors: Minseop Kim, Seoul (KR); Hongje Park, Gyeonggi-do (KR); Jongwon Park, Seoul (KR); Sanghyeok Choi, Seoul (KR); Jeonghoon Lee, Sejong-si (KR); Joongjae Kim, Daejeon (KR); Ikchan Ju, Daejeon (KR)

(73) Assignees: MAKINAROCKS CO., LTD., Seoul (KR); HANON SYSTEMS, Daejeon (KR)

( * ) Notice: Subject to any disclaimer, the term of this patent is extended or adjusted under 35 U.S.C. 154(b) by 0 days.

(21) Appl. No.: 18/492,215

(22) Filed: Oct. 23, 2023

(65) Prior Publication Data
US 2024/0159413 A1 May 16, 2024

(30) Foreign Application Priority Data

Nov. 14, 2022 (KR) .................. 10-2022-0151351
May 8, 2023 (KR) .................. 10-2023-0059155

(51) Int. Cl.
*F24F 11/62* (2018.01)
*B60H 1/00* (2006.01)
(Continued)

(52) U.S. Cl.
CPC ............ *F24F 11/62* (2018.01); *B60H 1/0073* (2019.05); *B60H 1/3205* (2013.01);
(Continued)

(58) Field of Classification Search
USPC .......................................... 700/276
See application file for complete search history.

(56) References Cited

U.S. PATENT DOCUMENTS

| 11,645,728 B2 | 5/2023 | Joo et al. |
| 2020/0005185 A1 | 1/2020 | Kim |

(Continued)

FOREIGN PATENT DOCUMENTS

| KR | 101251873 B1 | 4/2013 |
| KR | 1020180068025 A | 6/2018 |

(Continued)

OTHER PUBLICATIONS

Zou et al., "Towards optimal control of air handling units using deep reinforcement learning and recurrent neural network" Building and Environment vol. 168, Jan. 2020, 15 Pgs., (Year: 2020).*

(Continued)

*Primary Examiner* — Emilio J Saavedra
(74) *Attorney, Agent, or Firm* — Umberg Zipser LLP

(57) ABSTRACT

Disclosed is a method for controlling an air conditioning device, which is performed by at least one computing device, which includes: determining a control action for the air conditioning device at a first time point by using a reinforcement learning agent; determining a reward for the control action at the first time point based on a reward delay time by using the reinforcement learning agent; and performing reinforcement learning related to the control of the air conditioning device based on the determined reward, in which a time point when the reward delay time elapses from the first time point corresponds to a second time point, and the reward for the control action at the first time point is calculated while excluding situations after the first time point and before the second time point.

9 Claims, 10 Drawing Sheets

(51) Int. Cl.
    *B60H 1/32*     (2006.01)
    *F24F 110/10*     (2018.01)
    *F24F 110/20*     (2018.01)
    *F24F 110/50*     (2018.01)
    *G05B 13/02*     (2006.01)
    *G06N 20/00*     (2019.01)

(52) U.S. Cl.
    CPC ....... *F24F 2110/10* (2018.01); *F24F 2110/20* (2018.01); *F24F 2110/50* (2018.01); *G05B 13/0265* (2013.01); *G06N 20/00* (2019.01)

(56) References Cited

U.S. PATENT DOCUMENTS

| | | | |
|---|---|---|---|
| 2021/0081723 A1* | 3/2021 | Wayne | ................ G06F 18/2193 |
| 2022/0138874 A1 | 5/2022 | Joo et al. | |
| 2022/0268479 A1 | 8/2022 | Jang et al. | |

FOREIGN PATENT DOCUMENTS

| | | |
|---|---|---|
| KR | 1020200010973 A | 1/2020 |
| KR | 102131414 B1 | 7/2020 |
| KR | 102234270 B1 | 3/2021 |
| KR | 1020210032266 A | 3/2021 |
| KR | 1020210103609 A | 8/2021 |
| KR | 1020220057396 A | 5/2022 |
| KR | 102439453 B1 | 9/2022 |
| KR | 102457016 B1 | 10/2022 |

OTHER PUBLICATIONS

Bouteiller et al., "Reinforcement Learning With Random Delays" International conference on learning representations, 2021, 21 pgs., (Year: 2021).*

Bajo, "Reinforcement Learning [Part 2]: The Q-learning Algorithm" Mar. 28, 2022, accessed at: https://hackernoon.com/reinforcement-learning-part-2-the-q-learning-algorithm 27 pg. Printout (Year: 2022).*

Watkins, "Learning from Delayed Rewards" PhD thesis, King's College, May 1989, 241 pages (Year: 1989).*

Gwang-yong, Park, (An) application study of reinforcement learning algorithm for building hvac system control, available at http://www.riss.kr/link?id=T9740599.

Namatēvs, Ivars, Deep Reinforcement Learning on HVAC Control, Riga Technical University & Turiba University, Riga, Latvia, Dec. 2018, vol. 21, pp. 29-36, https://itms-journals.rtu.lv.

* cited by examiner

METHOD FOR CONTROLLING AIR CONDITIONING DEVICE BASED ON DELAYED REWARD

CROSS-REFERENCE TO RELATED APPLICATIONS

This application claims priority to and the benefit of Korean Patent Application No. 10-2022-00151351 filed in the Korean Intellectual Property Office on Nov. 14, 2022, the entire contents of which are incorporated herein by reference.

TECHNICAL FIELD

The present disclosure relates to a method for optimally controlling an air conditioning device, and more particularly, to a method for optimally controlling an air conditioning device based on a reinforcement learning method.

BACKGROUND ART

An air conditioning device is a device that controls temperature, humidity, air flow, etc. Such an air conditioning device can include an evaporator, an expansion valve, a compressor, a condenser, and the like, and can be controlled by an air conditioning device control model.

On the other hand, in a process of calculating an action for optimally controlling the air conditioning device at each time point, there are many factors to be considered in the calculation, so it is difficult for designers to directly create an algorithm, so to generate an optimal action, technologies related to reinforcement learning are being actively grafted into the field of air conditioning device control.

However, the air conditioning device has a delayed time between a change in control value and the resulting change in output value, making it difficult to optimally control the air conditioning device through reinforcement learning. For example, even if a heating amount of a cooling water heater included in the air conditioning device is controlled at a specific time point, an internal temperature of an air conditioning system does not immediately change to a target temperature by this control, and the target temperature can be reached after a certain delay time has elapsed, so it is difficult to implement optimal control by a conventional reinforcement learning scheme.

Thus, there is a demand for a technical solution that can solve the problem of controlling the air conditioning device.

On the other hand, the present disclosure has been derived at least based on the technical background described above, but the technical problem or object of the present disclosure is not limited to solving the problems or disadvantages described above. That is, the present disclosure may cover various technical issues related to the content to be described below, in addition to the technical issues discussed above.

SUMMARY OF THE INVENTION

The present disclosure is contrived in response to the background art, and has been made in an effort to provide a method for optimally learning a control model for controlling an air conditioning device.

Meanwhile, a technical object to be achieved by the present disclosure is not limited to the above-mentioned technical object, and various technical objects can be included within the scope which is apparent to those skilled in the art from contents to be described below.

An exemplary embodiment of the present disclosure provides a method for controlling an air conditioning device, which is performed by at least one computing device. The method may include: determining a control action for the air conditioning device at a first time point by using a reinforcement learning agent; determining a reward for the control action at the first time point based on a reward delay time by using the reinforcement learning agent; and performing reinforcement learning related to the control of the air conditioning device based on the determined reward, and a time point when the reward delay time elapses from the first time point may correspond to a second time point, and wherein the reward for the control action at the first time point may be calculated while excluding situations after the first time point and before the second time point.

In an exemplary embodiment, the determining of the reward for the control action at the first time point may include determining the reward for the control action at the first time point under the assumption that the control action for the air conditioning device at the first time point is maintained to a time point when an action maintenance time elapses from the first time point, and wherein the time point when the action maintenance time elapses from the first time point may correspond to a third time point. In an exemplary embodiment, the action maintenance time may be equal to the reward delay time, or longer than the reward delay time, and wherein the third time point may be a time point equal to the second time point or a time point later than the second time point.

In an exemplary embodiment, the determining of the reward for the control action at the first time point when the action maintenance time is equal to the reward delay time may include determining the reward for the control action at the first time point based on a situation at the second time point without considering the situations after the first time point and before the second time point.

In an exemplary embodiment, the determining of the reward for the control action at the first time point when the action maintenance time is longer than the reward delay time may include determining the reward for the control action at the first time point based on situations at the second to third time points without considering the situations after the first time point and before the second time point.

In an exemplary embodiment, the air conditioning device may include a heating, ventilation, and air conditioning (HVAC) system or a thermal management system, and the control action may include at least one of a control action for a compressor RPM value, a control action for a valve opening amount (e.g., a refrigerant expansion valve opening amount), a control action for a heating amount of a cooling water heater, a control action for a condenser, a control action for an evaporator, a control action for a radiator, a control action for an accumulator, a control action for a chiller, a control action for an outdoor heat exchanger, and a control action for an air purifying device, or a control action for a waste heat recovery device.

In an exemplary embodiment, the reward may be calculated based on internal situation information of the HVAC system or the thermal management system, and wherein the internal situation information may include at least one of compressor information, condenser information, evaporator information, valve opening amount information (e.g., a refrigerant expansion valve opening amount), cooler information, heater information, waste heat recovery information, temperature information, humidity information, air cleanliness information, or air flow information.

Another exemplary embodiment of the present disclosure provides an apparatus which may include: at least one processor; and a memory, in which the processor is configured to determine a control action for the air conditioning device at a first time point by using a reinforcement learning agent, determine a reward for the control action at the first time point based on a reward delay time by using the reinforcement learning agent, and perform reinforcement learning related to the control of the air conditioning device based on the determined reward, and wherein a time point when the reward delay time elapses from the first time point corresponds to a second time point, and the reward for the control action at the first time point is calculated while excluding situations after the first time point and before the second time point.

Still another exemplary embodiment of the present disclosure provides a computer program stored in a non-transitory computer readable storage medium, wherein the computer program performs operations for controlling an air conditioning device when executed by one or more processors included in a computing device, the operations comprising: an operation of determining a control action for the air conditioning device at a first time point by using a reinforcement learning agent; an operation of determining a reward for the control action at the first time point based on a reward delay time by using the reinforcement learning agent; and an operation of performing reinforcement learning related to the control of the air conditioning device based on the determined reward, and wherein a time point when the reward delay time elapses from the first time point corresponds to a second time point, and wherein the reward for the control action at the first time point may be calculated while excluding situations after the first time point and before the second time point.

According to the present disclosure, an air conditioning device can be optimally controlled based on a reinforcement learning method. For example, according to the present disclosure, reinforcement learning reward can be configured by reflecting a characteristic in which there is a delayed time between control of the air conditioning device and an environmental change, and based on this, the air conditioning device can be optimally controlled and simultaneously, more stably controlled.

Meanwhile, the effects of the present disclosure are not limited to the above-mentioned effects, and various effects can be included within the scope which is apparent to those skilled in the art from contents to be described below.

DETAILED DESCRIPTION

Figure 1:
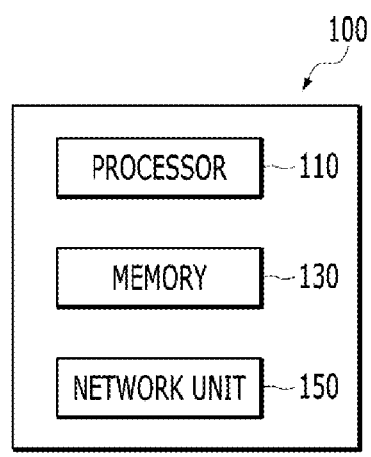
FIG. 1 is a block diagram of a computing device performing actions according to an exemplary embodiment of the present disclosure.

Various embodiments will now be described with reference to drawings. In the present specification, various descriptions are presented to provide appreciation of the present disclosure. However, it is apparent that the embodiments can be executed without the specific description.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers.

Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

Moreover, the term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

Further, it should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

In addition, the term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the embodiments disclosed herein may be additionally implemented as electronic hardware, computer software, or combinations of both sides. To clearly illustrate the interchangeability of hardware and software, various illustrative components, blocks, constitutions, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented embodiments is provided so that those skilled in the art of the present disclosure use or implement the present disclosure. Various modifications to the embodiments will be apparent to those skilled in the art. Generic principles defined herein may be applied to other embodiments without departing from the scope of the present disclosure. Therefore, the present disclosure is not limited to the embodiments presented herein. The present disclosure should be analyzed within the widest range which is coherent with the principles and new features presented herein.

A configuration of the computing device 100 illustrated in FIG. 1 is only an example simplified and illustrated. In an exemplary embodiment of the present disclosure, the computing device 100 may include other components for performing a computing environment of the computing device 100, and only some of the disclosed components may constitute the computing device 100.

The computing device 100 may include a processor 110, a memory 130, and a network unit 150.

The processor 110 may be constituted by one or more cores, and include processors for data analysis and deep learning, such as a central processing unit (CPU), a general purpose graphics processing unit (GPGPU), a tensor processing unit (TPU), etc., of the computing device. The processor 110 may read a computer program stored in the memory 130 and process data for machine learning according to an exemplary embodiment of the present disclosure. According to an exemplary embodiment of the present disclosure, the processor 110 may perform an operation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, the GPGPU, and the TPU of the processor 110 may process learning of the network function. For example, the CPU and the GPGPU may process the learning of the network function and data classification using the network function jointly. In addition, in an exemplary embodiment of the present disclosure, the learning of the network function and the data classification using the network function may be processed by using processors of a plurality of computing devices together. In addition, the computer program performed by the computing device according to an exemplary embodiment of the present disclosure may be a CPU, GPGPU, or TPU executable program.

According to an exemplary embodiment of the present disclosure, the memory 130 may store any type of information generated or determined by the processor 110 and any type of information received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

In the present disclosure, the network unit 110 may be configured regardless of a communication aspect, such as wired communication and wireless communication, and may be configured by various communication networks, such as a Personal Area Network (PAN) and a Wide Area Network (WAN). Further, the network may be a publicly known World Wide Web (WWW), and may also use a wireless transmission technology used in short range communication, such as Infrared Data Association (IrDA) or Bluetooth.

The techniques described herein may be used not only in the networks mentioned above, but also in other networks.

The processor 110 according to an exemplary embodiment of the present disclosure may perform reinforcement learning related to control of an air conditioning device based on the determined reward. In this case, in the present disclosure, the term 'control of the air conditioning device' may mean controlling one or more control variables associated with an action of the air conditioning device or an air conditioning system to be controlled. For example, the control variable may include control variables associated with a control action for a compressor RPM value, a control action for a valve opening amount, a control action for a heating amount of a cooling water heater, a control action for a condenser, a control action for an evaporator, a control action for a radiator, a control action for an accumulator, a control action for a chiller, a control action for an outdoor heat exchanger, and a control action for an air purifying device, and a control action for a waste heat recovery device. Further, the control variables may include various control variables related to control of temperature, humidity, cleanliness of air, air flow of the air, etc., in addition to exemplary control variables.

Figure 2:
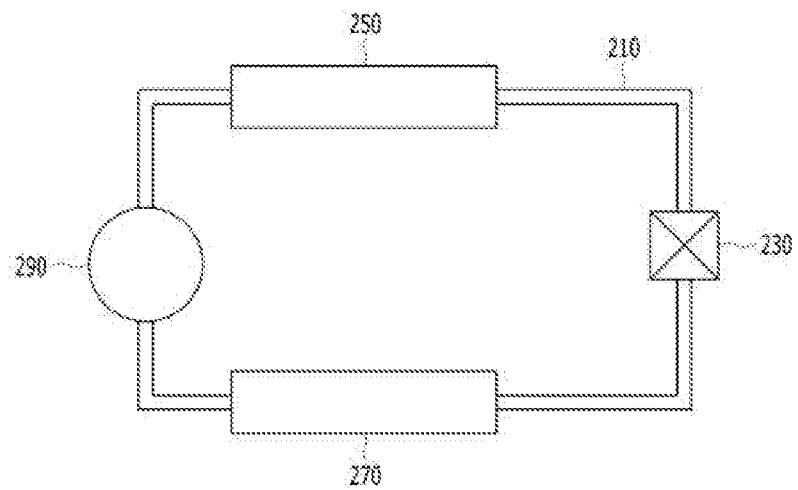
FIG. 2 is an exemplary view conceptually expressing components included in an air conditioning device.

FIG. 2 is an exemplary view conceptually expressing exemplary components included in an air conditioning device.

According to an exemplary embodiment, the air conditioning device may include at least one of a pipe 210, an expansion valve 230, a condenser 250, an evaporator 270, a compressor 290, or heater information. In addition, the air conditioning device may further include a waste heat recovery device. For example, the air conditioning device may include a waste heat recovery device that recovers waste heat related to vehicle driving, such as waste heat from a vehicle driving motor and an inverter. In addition, the air conditioning device may further include a radiator, an accumulator, a chiller, an outdoor heat exchanger, an air purifying device, and the like. Meanwhile, the air conditioning device may be controlled by receiving a control signal according to a calculation result of the processor 110 of the present disclosure. In this case, the control action which may be performed by the processor 110 may include a control action for the compressor RPM value, a control action for the valve opening amount, a control action for the heating amount of the cooling water heater, a control action for the condenser, a control action for the evaporator, a control action for the radiator, a control action for the accumulator, a control action for the chiller, a control action for the outdoor heat exchanger, and a control action for the air purifying device, or a control action for the waste heat recovery device.

The processor 110 uses various sensors (e.g., a temperature sensor, a humidity sensor, an ultrasonic sensor, an acceleration sensor, an infrared sensor, a time sensor, a voltage sensor, etc.) to calculate internal situation information of the air conditioning device (or a target on which the air conditioning device is installed). In this case, the internal situation information may include at least one of compressor information, condenser information, evaporator information, valve opening amount information (e.g., refrigerant expansion valve opening amount information), heater information, waste heat recovery information, temperature information, humidity information, air cleanliness information, or air flow information. That is, the internal situation information may be a physical amount measured by a specific sensor.

In this case, the internal situation information acquired by the processor 110 according to an exemplary embodiment of the present disclosure may be information acquired or predicted according to a predetermined time point (time interval) during an operation process of a target (e.g., vehicle) in which the air conditioning device is installed. Further, the internal situation information may be internal situation information of the air conditioning device or the target in which the air conditioning device is installed. In the present disclosure, the internal situation information may be distinguished from each other according to an acquisition time point or a prediction time point. The time point may be set to a minimum time unit for control, and for example, the unit of the time point may be set at an interval such as 1 second, 10 seconds, 1 minute, etc. The processor 110 may acquire the internal situation information for each time point of a predetermined interval including 'first time point', 'second time point', and 'third time point' in the process of actually driving the vehicle. Meanwhile, in the present disclosure, the terms such as 'first time point', 'second time point', and 'third time point' are used to distinguish one component from other components and to maintain consistency of an indication target throughout the specification, and the scope of rights should not be limited by these terms. Further, the configuration described above by referring to FIG. 2 is just an example for describing the control target and target information of the present disclosure does not limit the present disclosure, and an exemplary embodiment of the present disclosure may be applied to various devices controllable by the processor 110 without limitation based on the internal situation information.

In relation to an exemplary embodiment of the present disclosure, the processor 110 may directly control an actual air conditioning device, but perform an action a simulation model including a dynamic model and determine the reward according to the control action. The simulation model may be a model that generates situation information related to the air conditioning device described above by referring to FIG. 2. The actual air conditioning device and the simulation model may be distinguished from each other according to a physical system generating the situation information actually exists. The actual air conditioning device may be, for example, a part or the entirety of an air conditioning system that generates the situation information by a physical sensor. The simulation model may be, for example, a functional mock-up unit (FMU) model. The FMU model may mean a model that follows a functional mock-up interface (FMI) protocol, and may be a model for returning an output for an input. The processor 110 may transfer control information to the FMU model, and then acquire the state information based on a value received from the FMU model. Further, the simulation model may also be implemented as an artificial neural network model. Meanwhile, the actual air conditioning device and the simulation model according to the present disclosure have a common point that both models are black box models in that the output is generated for the input while a casual relationship between the input and the output.

Meanwhile, the air conditioning device is not limited to the exemplary embodiment disclosed in FIG. 2, and may be implemented in various forms. For example, the air conditioning device may include various types of devices that controls the temperature, the humidity, the air cleanliness, and the air flow. Further, the air conditioning device may also include various types of thermal management devices, such as an eco-friendly vehicle integrated thermal management device.

The method for performing the reinforcement learning according to the present disclosure will be described in more detail with reference to FIG. 3.

Figure 3:
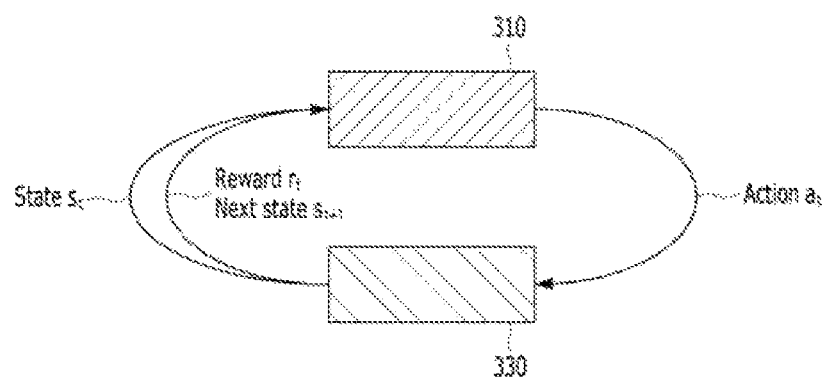
FIG. 3 is an exemplary view expressing a reinforcement learning control model in order to describe reinforcement learning.

FIG. 3 is a conceptual view illustrating a simulation model and a reinforcement learning agent in order to describe the reinforcement learning method. A simulation model 330 is a subject that returns the state information and the reward. A reinforcement learning agent 310 is a subject that determines an action based on the situation information and the reward. In the present disclosure, the situation information may include situation information at a current time point and situation information at a next time point. The situation information at the current time point and the situation information at the next time point may be classified according to time points at which the situation information is acquired, respectively. For example, the time points may be classified into "t, t+1 t+2, t+3" according to an occurrence order, and the "t, t+1 t+2, t+3" may be classified at an interval of 1 second, 10 seconds, or 1 minute.

The reinforcement learning agent according to the present disclosure may be learned based on at least one episode. In the present disclosure, the "episode" may be used as a term meaning a data sequence having a series of orders. The episode may be a data set constituted by a plurality of E-tuple data including E (E is a natural number of 1 or more) elements. The plurality of E-tuple data included in the episode may have a series of orders. As an example related to the E-tuple data, when E is '4', respective 4-tuple data may include current situation information, a control action at the current time point, a reward at the current time point, and next situation information as elements. As an example related to the E-tuple data, when E is '5', respective 5-tuple data may also include current time point situation information, a control action at the current time point, a reward at the current time point, and next time point situation information, a control action at the next time point as elements.

The processor 110 according to the present disclosure may acquire one episode by repeatedly performing a plurality of steps of the above-described learning method from a starting state to a final state. The final state may be derived when a predetermined end condition is satisfied or when a predetermined number of steps are conducted. The step indicates at least one action unit in which the reinforcement learning control model receives a state and determines an action, and then receives a reward for the action or updated state information. The number of predetermined steps may be set to an arbitrary natural number, and may be constituted by, for example, 200 steps.

The processor 110 may acquire learning data for each of the steps included in the episode. For example, the processor 110 may acquire current situation information related to an arbitrary time point T, determine the control action based on the current situation information by utilizing the reinforcement learning agent, acquire the reward from the situation information as a result of the control action, and acquire the next state information from the environment as a result of the control action. In this case, the situation information may be stored in the memory 130 as the learning data in a tuple form such as [situation information at the current time point $S_t$, the control action at the current time point $A_t$, the reward at the current time point $R_t$, and the next situation information $S_{t+1}$]. The time point t of the learning data may proceed to a time point t+1 for a next state when situation information updated as a result of the action determined by the reinforcement learning agent is acquired.

The processor 110 may train the reinforcement learning agent based on at least one learning data. As an example, the processor 110 may train the reinforcement learning agent based on the learning data corresponding to each step each time each step ends.

The process in which the processor 110 performs the reinforcement learning according to the present disclosure may include a step of modifying each node weight or bias value of a neural network included in the reinforcement learning agent. The step of modifying each node weight or bias value of the neural network included in the reinforcement learning agent may be performed by the same or similar method as a backpropagation technique for the neural network described above with reference to FIG. 4 by the processor 110. For example, when the reward $R_t$ included in the learning data for an arbitrary time point t is a positive number, the processor 110 may control weights or bias values of one or more nodes included in the reinforcement learning agent so that the control action $A_t$ for the arbitrary time point t included in the learning data is reinforced. In this case, one or more nodes included in the reinforcement learning control model may be nodes which receives the situation information $S_t$ included in the learning data for the arbitrary time point t as an input, and then involved in determining the control action $A_t$.

Meanwhile the reinforcement learning agent 310 may determine the action in each state information so that a cumulative value (i.e., return) of the reward given from the simulation model 330 becomes maximum. A method for determining the action by the reinforcement learning agent 310 may be based on, for example, at least one of a value-based action determination method, a policy-based action determination method, and a both-value and policy-based action determination method. The value-based action determination method is a method for determining an action of giving a highest value in each state based on a value function. An example of the value-based action determination method may include Q-learning, deep Q-network (DQN), etc. The policy-based action determination method is a method for determining the action based on a final return and a policy function without the value function. An example of the policy-based action determination method may include a policy gradient technique, etc. The both-value and policy-based action determination method is a method for determining the action of the reinforcement learning agent by learning in a scheme in which when the policy function determines the action, the value function evaluates the action. The both-value and policy-based action determination method may include, for example, an Actor-Critic algorithm, a Soft Actor-Critic algorithm, an A2C algorithm, an A3C algorithm, and the like.

The reinforcement learning agent according to the present disclosure for controlling the air conditioning device may operate based on a neural network model. The neural network model may have a structure including one or more neural network layers, and each neural network layer may include at least one node. Hereinafter, the structure of the neural network model included in the reinforcement learning agent will be described in detail with reference to FIG. 4.

Figure 4:
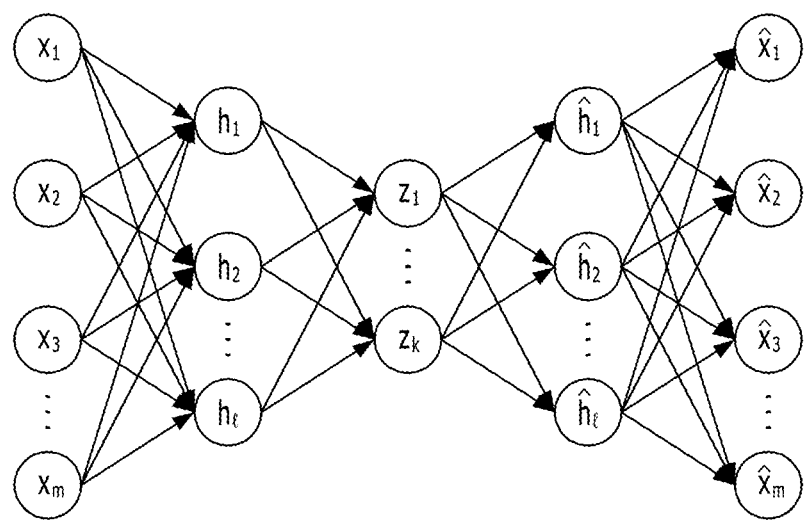
FIG. 4 is a schematic view illustrating a neural network according to the present disclosure.

FIG. 4 is a schematic diagram illustrating a network function according to the embodiment of the present disclosure. Throughout the present specification, the meanings of a calculation model, a nerve network, the network function, and the neural network may be interchangeably used. The neural network may be formed of a set of interconnected calculation units which are generally referred to as "nodes". The "nodes" may also be called "neurons". The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weight values between the links are different, the two neural networks may be recognized to be different from each other.

The neural network may consist of a set of one or more nodes. A subset of the nodes configuring the neural network may form a layer. Some of the nodes configuring the neural network may form one layer on the basis of distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the embodiment of the present disclosure, the number of nodes of the input layer may be the same as the number of nodes of the output layer, and the neural network may be in the form that the number of nodes decreases and then increases again from the input layer to the hidden layer. Further, in the neural network according to another embodiment of the present disclosure, the number of nodes of the input layer may be smaller than the number of nodes of the output layer, and the neural network may be in the form that the number of nodes decreases from the input layer to the hidden layer. Further, in the neural network according to another embodiment of the present disclosure, the number of nodes of the input layer may be larger than the number of nodes of the output layer, and the neural network may be in the form that the number of nodes increases from the input layer to the hidden layer. The neural network according to another embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a Long Short-Term Memory (LSTM), a transformer, a restricted Boltzmann machine (RBM), a deep belief network (DBN), a Q network, a U network, a Siamese network, a Generative Adversarial Network (GAN), and the like. The foregoing description of the deep neural network is merely illustrative, and the present disclosure is not limited thereto.

In the embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The auto encoder may perform a nonlinear dimension reduction. The number of input layers and the number of output layers may correspond to the dimensions after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The neural network may be trained in a direction of minimizing an error of an output. Detailed method of reinforcement learning for neural networks is described later. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. A change amount of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

Hereinafter, by referring to steps S500 to S520 of FIG. 5, an overview process of a method for controlling the air conditioning device according to an exemplary embodiment of the present disclosure will be described.

Figure 5:
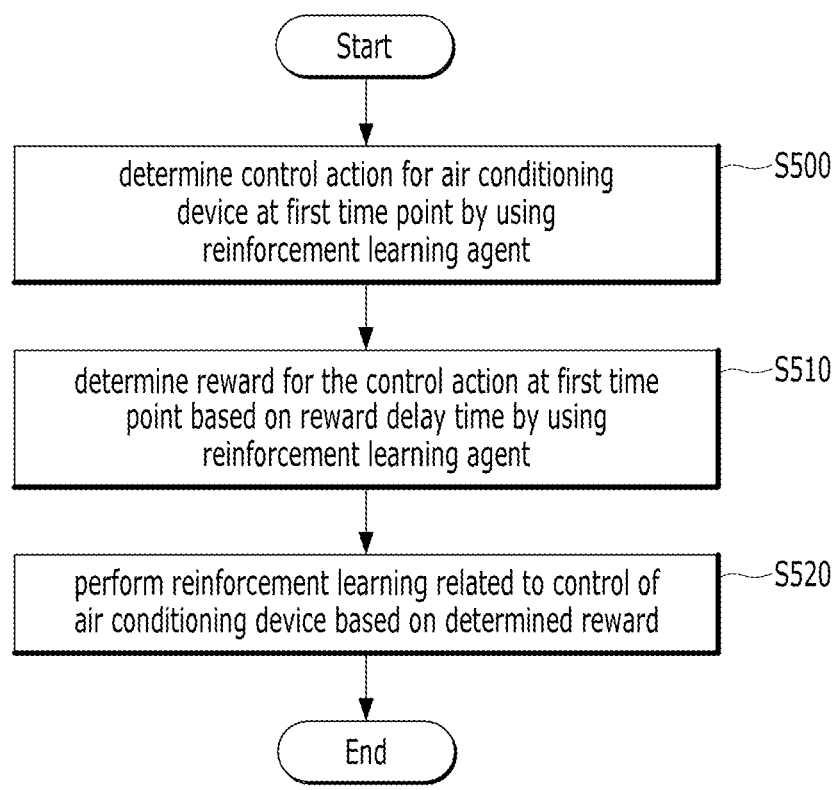
FIG. 5 is a flowchart expressing a method for performing reinforcement learning according to an exemplary embodiment of the present disclosure.

Referring to FIG. 5, the processor 110 may perform "a step S500 of determining a control action for the air conditioning device at a first time point using the reinforcement learning agent", "a step S510 of determining a reward for the control action at the first time point based on a reward delay time using the reinforcement learning agent", and "a step S520 of performing reinforcement learning related to control of the air conditioning device based on the determined reward".

In this case, a time point when the reward delay time has elapsed from the first time point may correspond to a second time point, and the reward for the control action at the first time point may be calculated while excluding situations after the first time point and before the second time point. That is, process 110 may calculate the reward for the reinforcement learning without considering situations for the reward delay time. In addition, the reward for the control action at the first time point may be calculated under the assumption that the control action for the air conditioning device at the first time point is maintained from the first time point to a time point when the action maintenance time elapses. If the time points mentioned above are more clearly organized, the first time point, the second time point, and the third time point may be 'first time point=first time point', 'second time point=first time point+reward delay time', and 'third time point=first time point+action maintenance time', respectively. Further, the action maintenance time may be equal to or the reward delay time or longer than the reward delay time (that is, reward delay time≤action maintenance time). Further, the third time point may be the same time point as the second time point, or may be a later time point than the second time point. That is, when the third time point acquired by adding the action maintenance time to the first time point and the second time point acquired by adding the reward delay time to the first time point are compared with each other, "second time point≤third time point".

In relation to step S510 above, which is performed by the processor 110, when the action maintenance time is equal to the reward delay time (hereinafter, in the case of S510A), the processor 110 may perform "a step S511A of determining the reward for the control action at the first time point based on the situation at the second time point without considering the situations after the first time point and before the second time point" (a detailed exemplary embodiment (hereinafter, referred to as Exemplary embodiment-1) related to S511A above will be described below in detail jointly with FIG. 6.).

On the contrary, in relation to step S510 above, which is performed by the processor 110, when the action maintenance time is longer than the reward delay time (hereinafter, in the case of S510B), the processor 110 may perform "a step S512B of determining the reward for the control action at the first time point based on the situation at the second to third time points without considering the situations after the first time point and before the second time point".

Specifically, in relation to the step S512B above, the processor 110 may perform "a step S512B-1 of calculating rewards considering the situations of the time points included in the second to third time points", "a step S512B-2 of calculating a representative value of the calculated rewards", and "a step S512B-3 of determining the representative value as a reward for the control action of the first time point".

An exemplary embodiment (hereinafter, referred to as Exemplary embodiment-2) related to step S512B above, which is performed by the processor 110, and steps S512B-1 to S512B-3 above will be described below in detail jointly with FIG. 7.

For example, the overview process of the method according to the present disclosure for controlling the air conditioning device by the processor 110 may include steps S500 to S520, and in relation to step S510 above, the processor 110 may selectively perform "S511A" (Exemplary embodiment-1) or "step S512B and steps S512B-1 to S512B-3" (Exemplary embodiment-2) according to whether the second time point and the third time point are the same as each other or the third time point exists after the second time point".

Meanwhile, in an exemplary embodiment of the present disclosure, the reward delay time and the action maintenance time used in the process of calculating the delay reward for the reinforcement learning may be predetermined or dynamically determined at each reward calculation time point. For example, the reward delay time and the action maintenance time may be dynamically determined at each reward calculation time point by utilizing a neural network structure of the reinforcement learning agent. Further, in this case, the reward delay time and the action maintenance time may be dynamically determined using an embedding vector based on a control action at the reward calculation time point, internal environment information, and external environment information.

The air conditioning device mentioned in the first half of the present disclosure may include at least one of a heating, ventilation, and air conditioning (HVAC) system or a thermal management system, and the control action which the processor 110 generates based on the reinforcement learning agent may include at least one of a control action for the compressor RPM value, a control action for the valve opening amount, a control action for the heating amount of the cooling water heater, a control action for the condenser, a control action for the evaporator, a control action for the radiator, a control action for the accumulator, a control action for the chiller, a control action for the outdoor heat exchanger, and a control action for the air purifying device, or a control action for the waste heat recovery device. However, the air conditioning device and the control actions are not limited thereto, and various elements may be included according to a situation.

The reward mentioned in the first half of the present disclosure may be calculated based on internal situation information of the HVAC system or the thermal management system (or a target in which the system is installed), and the internal situation information may include at least one of compressor information, condenser information, expander information, evaporator information, valve opening amount information (e.g., refrigerant expansion valve opening amount information), heater information, waste heat recovery information, temperature information, humidity information, air cleanliness information, or air flow information. Further, the internal situation information of the HVAC system or the thermal management system (or the target in which the system is installed) may be acquired based on a simulation environment that simulates an interaction of the HVAC system or the thermal management system (or the target in which the system is installed). In an exemplary embodiment, the simulation environment may be implemented by a dynamic model including the neural network structure.

Figure 6:
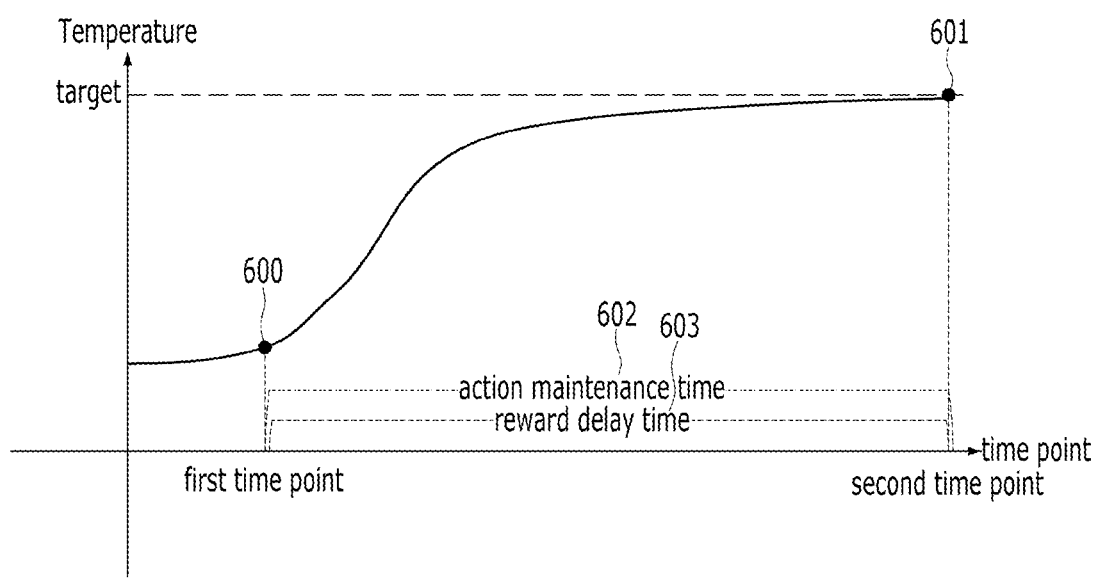
FIG. 6 is a schematic view expressing a case where an action maintenance time is the same as a reward delay time according to an exemplary embodiment of the present disclosure.
Figure 7:
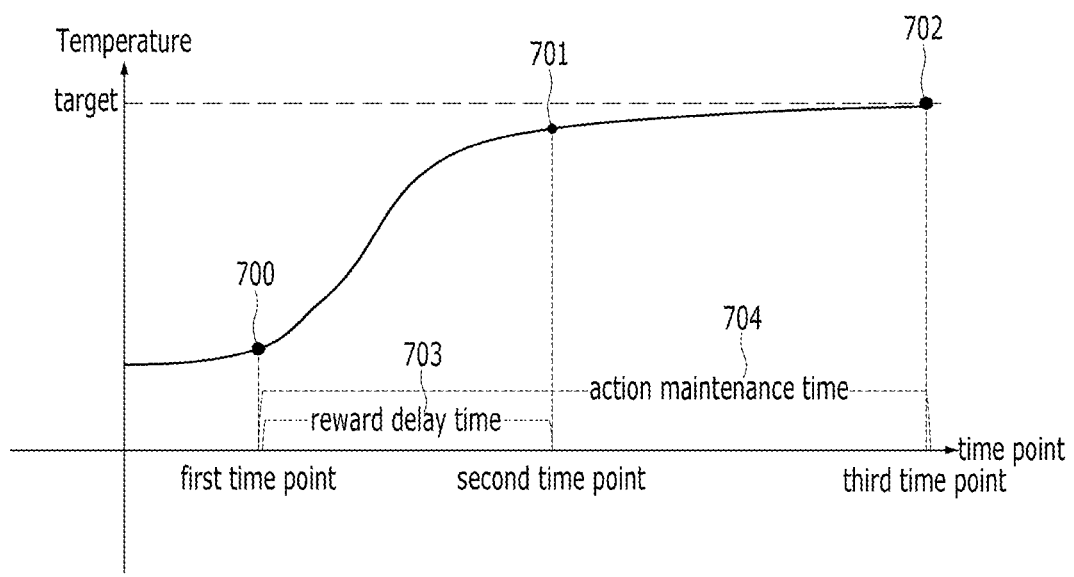
FIG. 7 is a schematic view expressing a case where the action maintenance time is longer than the reward delay time according to an exemplary embodiment of the present disclosure.

FIG. 6 is a schematic view expressing a case where an action maintenance time is the same as a reward delay time according to an exemplary embodiment of the present disclosure and FIG. 7 is a schematic view expressing a case where the action maintenance time is longer than the reward delay time according to an exemplary embodiment of the present disclosure. Hereinafter, descriptions of Exemplary embodiment-1 and Exemplary embodiment-2 will be disclosed jointly with examples with reference to FIGS. 6 and 7, respectively.

Hereinabove, it is mentioned that the processor 110 may perform steps S500 to S520 in order to control the air conditioning device. Further, in relation to step S510 above, the processor 110 may selectively perform "step S511A" (Exemplary embodiment-1) or "step S512B and "steps S512B-1 to S512B-3" (Exemplary embodiment-2) according to "whether the second time point and the third time point are the same as each other (that is, the action maintenance time is the same as the reward delay time) or whether the third time point exists after the second time point (that is, the action maintenance time is longer than the reward delay time)".

First, in relation to Exemplary embodiment-1, referring to FIG. 6, the processor 110 may determine, as a first time point 600, a time point when a control action to be subjected to the reward calculation is performed, and determine, as a second time point 601, a time point when a reward delay time 603 elapses from the first time point 600. Further, when the action maintenance time 602 is equal to the reward delay time 603, the processor 110 may "determine the reward for the control action at the first time point 600 based on the situation of the air conditioning device at the second time point 601 without considering the situations after the first time point 600 and before the second time point 601 (S511A)".

For example, in relation to step S511A above, assuming that "the interval between the time points is 10 seconds, the first time point 600 when the control action to be subjected to the reward calculation is performed corresponds to a time point t, and the action maintenance time 602 and the reward delay time 603 are equal to each other as 50 seconds, the time point t (first time point) may correspond to 0 second, a time point t+1 may correspond to 10 seconds, a time point t+2 may correspond to 20 seconds, a time point t+3 may correspond to 30 seconds, a time point t+4 may correspond to 40 seconds, and a time point t+5 (second time point) may correspond to 50 seconds. In this case, the processor 110 may determine the reward for the time point t which is the first time point 600 by considering one of a situation at the time point t+5 or a situation after the time point t+5 without considering situations from the first time point 600 t to the second time point 601 before the time point t+5 (i.e., t, t+1, t+2, t+3, and t+4).

Meanwhile, the processor 110 may determine, as the first time point 600, the time point when the control action to be subjected to the reward calculation is performed, and sequentially switch the first time point from the first time point 600 at a predetermined interval (i.e., t→t+1→t+2 . . . ) and perform the action corresponding to S511A.

For example, in relation to step S511A above, when the predetermined time point interval is 10 seconds (e.g., 0 second, 10 seconds, 20 seconds, etc.), the 0-second time point is the first time point 600, and the action maintenance time 602 is equal to the reward delay time 603 as 50 seconds, the processor 110 may consider a situation at a 50-second time point (without considering situations after 0 second and before 50 seconds) for the reward for a control action at a 0-second time point, consider a situation at the 60-second time point (without considering situations after 10 seconds and before 60 seconds) for the reward for a control action at a 10-second time point, and consider a situation at a 70-second time point (without considering situations after 20 seconds and before 70 seconds) for the reward for a control action at a 20-second time point. Meanwhile, as mentioned above, the action maintenance time 602 and the reward delay time 603 may not be predetermined values, but may be dynamically configured. For example, the action maintenance time 602 and the reward delay time 603 may be dynamically determine as 31 seconds in relation to the control action at the 0-second time point and dynamically determined as 27 seconds in relation to the control action at the 10-second time point. In this case, the processor 110 may consider a situation at a 31-second time point (without considering situations after 0 second and before 31 seconds) for the reward for the control action at the 0-second time point, and consider a situation at a 37-second time point (without considering situations after 10 seconds and before 37 seconds) for the reward for the control action at the 10-second time point. In an exemplary embodiment, the action maintenance time 602 and the reward delay time 603 may be dynamically determine at each reward calculation time point (i.e., control action time point) by using the neural network structure of the reinforcement learning agent. Further, the action maintenance time 602 and the reward delay time 603 may be dynamically determined using an embedding vector based on a control action at the reward calculation time point, internal environment information, and external environment information.

Subsequently, in relation to Exemplary embodiment-2, referring to FIG. 7, the processor 110 may determine, as a first time point 700, the time point when the control action to be subjected to the reward calculation is performed, determine, as a second time point 701, a time point when a reward delay time 703 elapses from the first time point 700, and determine, as a third time point 702, a time point when an action maintenance time 704 elapses from the first time point 700. In this regard, when the third time point 702 which is an end time point of the action maintenance time 704 is positioned at a time point after the second time point 701 which is an end time point of the reward delay time 703, the processor 110 may determine a reward for the control action at the first time point 700 based on situations at the second time point 701 to the third time point 702 without considering situations after the first time point 700 and before the second time point 701 (S512B). In this case, in determining the reward, the processor 110 may "calculate a reward considering the situations at the time points included in the second time point 701 to the third time point 702 (S512B-1)", calculate a representative value of the calculated rewards (S512B-2)", and "determine the representative value as a reward for the control action of the first time point 700 (S512B-3)". In addition, the representative value may be constituted by various representative values such as an average value, a median value, a mode value, a maximum value, a minimum value, etc., of rewards calculated based on the situations at the time points included in the second time point 701 to the third time point 702.

For example, in relation to step S512B-1, assuming that the first time point 700 is t, the second time point 701 is t+2, and the third time point 702 is t+5, the processor 110 may predict situations at a plurality of time points included in time points from t+2 to t+5 excluding the times point from t to t+2 (e.g., t+2, t+3, t+4, and t+5), and calculate a plurality of rewards based on the predicted situations at the plurality of time points. Subsequently, in relation to step S512B-2, the processor 110 may determine a representative value of the plurality of rewards associated with the time points from t+2 to t+5 (e.g., t+2, t+3, t+4, and t+5). In this case, a method for determining the representative value by the processor 110 may include various methods including an average value, a median value, a mode value, a maximum value, and a minimum value of the calculated plurality of rewards. Finally, in relation to step S512B-3, the processor 110 may determine the determined representative value as the reward for the control action at the time point t.

Meanwhile, the processor 110 may determine, as the first time point 700, the time point when the control action to be subjected to the reward calculation is performed, and sequentially switch the first time point from the first time point 700 at a predetermined interval (i.e., t→t+1→t+2 . . . ) and perform the actions corresponding to S512B-1 to S512B-3. For example, when the predetermined time point interval is 10 seconds (i.e., t+1−t=10 seconds), the action maintenance time 704 is 50 seconds, and the reward delay time 703 is 30 seconds, the reward for the 0-second time point (i.e., t) when the control action starts is determined based on the representative value of the 30 to 50-second time points (i.e., t+3 to t+5), the reward for the 10-second time point (i.e., t+1) may be determined based on the representative value of the 40 to 60-second time points (i.e., t+4 to t+6), and the reward for the 20-second time point (i.e., t+2) may be determined based on the representative value of the 50 to 70-second time points (i.e., t+5 to t+7). Meanwhile, as mentioned above, the action maintenance time 704 and the reward delay time 703 may not be predetermined values, but may be dynamically configured. For example, the action maintenance time 704 and the reward delay time 703 may be dynamically determined as 40 seconds and 31 seconds, respectively in relation to the control action at the 0-second time point and dynamically determined as 38 seconds and 27 seconds, respectively in relation to the control action at the 10-second time point. In this case, the processor 110 may consider situations at 31 to 40-second time points (without considering situations after 0 second and before 31 seconds) for the reward for the control action at the 0-second time point, and consider a situation at 37 to 48-second time points (without considering situations after 10 seconds and before 37 seconds) for the reward for the control action at the 10-second time point. In an exemplary embodiment, each of the action maintenance time 704 and the reward delay time 703 may be dynamically determined at each reward calculation time point (i.e., control action time point) by using the neural network structure of the reinforcement learning agent. Further, each of the action maintenance time 704 and the reward delay time 703 may be dynamically determined using an embedding vector based on a control action at the reward calculation time point, internal environment information, and external environment information.

Figure 8:
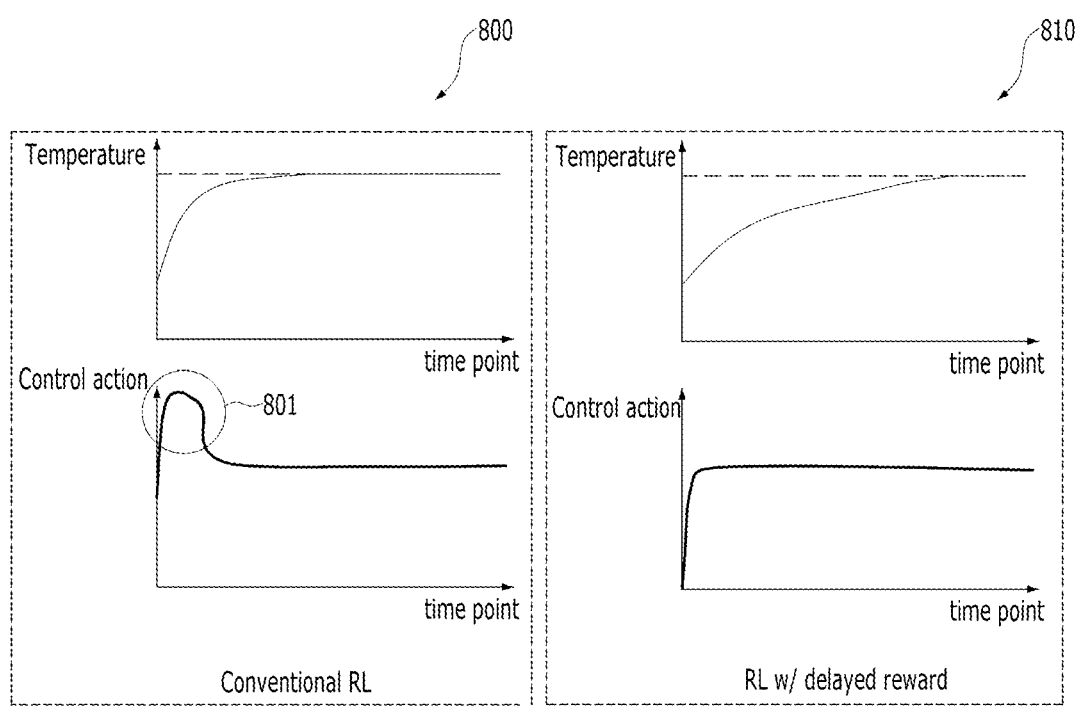
FIG. 8 is a schematic view illustrating progresses of a temperature and a control action when a method according to an exemplary embodiment of the present disclosure is used.
Figure 9:
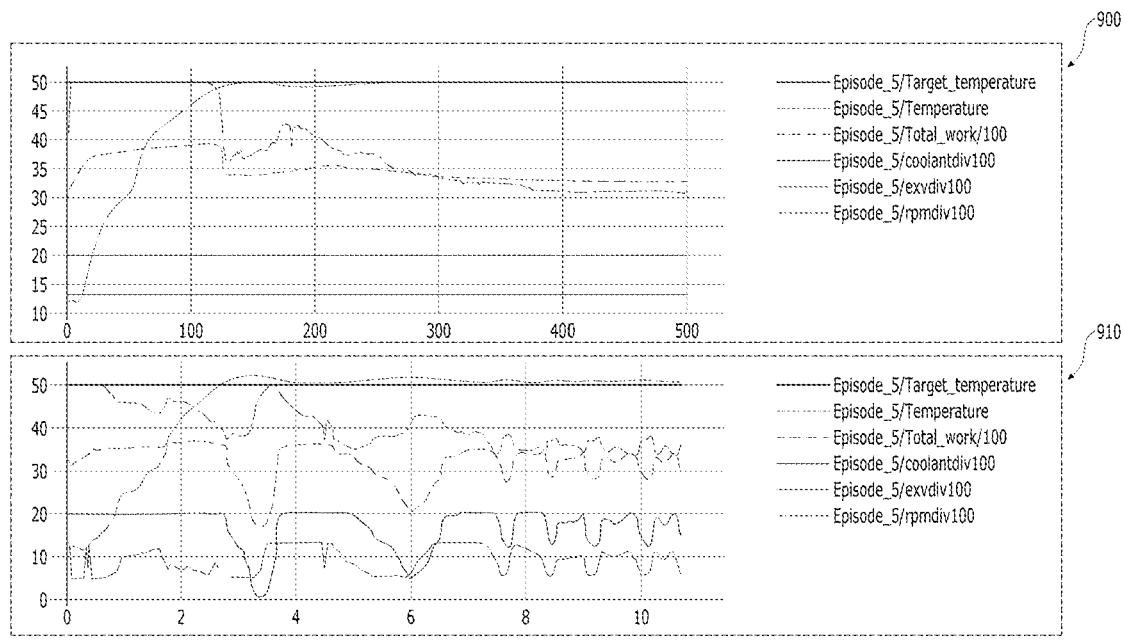
FIG. 9 is a schematic view illustrating a result acquired by a test using the method according to an exemplary embodiment of the present disclosure.

FIG. 8 is a schematic view illustrating progresses of a temperature and a control action when a method according to an exemplary embodiment of the present disclosure is used and FIG. 9 is a schematic view illustrating a result acquired by a test using the method according to an exemplary embodiment of the present disclosure.

In terms of effectiveness, when feedback (i.e., situational change) for the control action, as in the HVAC system or thermal management system, progresses slowly (i.e., when using the reinforcement learning, the delay time is much larger compared to other problems), compared to PID control or conventional reinforcement learning methods, the method according to an exemplary embodiment of the present disclosure can find a stabilizing point in a relatively short time and control the air conditioning device, so that the control stability of the reinforcement learning agent related to controlling the air conditioning device can be improved. In addition, since the number of rewards considered for learning is small compared to the conventional method, there is an advantage in that processing resources required for learning are relatively small. In addition, since the reward is calculated under the assumption that the control action is maintained for a certain period, even if the current situation is different from the target situation, the reinforcement learning is performed in a direction in which most of the control action at each time point can be kept constant. Therefore, fluctuations in control action can be stabilized. Due to the above effects, energy resources until reaching a target environment can be saved compared to the conventional methods (e.g., conventional reinforcement learning methods and PID methods).

Specifically, referring to FIG. 8, when comparing a control method 810 according to an exemplary embodiment of the present disclosure and a conventional control method 800 using the existing reinforcement learning method under the same situation conditions, it may be confirmed that the conventional control method 800 is learned without considering a stable control action, and the larger a difference between a target temperature and a current temperature, the higher the value related to the control action is measured, and a temperature during a specific time point period 801 rises sharply and the control action is unstable. On the other hand, in the control method 810 according to an exemplary embodiment of the present disclosure, it is assumed that the control action at a certain period of time point is constant and the agent is reinforcement-learned, so it can be confirmed that a temperature rise width is smooth and the control action is stable.

Referring to FIG. 9, when comparing a control method 900 according to an exemplary embodiment of the present disclosure progressed up to episode 5 under the same situation conditions and a conventional control method 910 using the existing reinforcement learning method progressed up to episode 5, in the control method 900 according to an exemplary embodiment of the present disclosure, it may be confirmed that the temperature relatively stably rises until reaching the target temperature, and the extent to which the target temperature is maintained even after reaching the target temperature is stable. In addition, it may be confirmed that the entire control action is stable and does not fluctuate compared to the conventional control method 910. That is, when the method according to an exemplary embodiment of the present disclosure is used, when the processor 110 controls the air conditioning device including the HVAC system or the thermal management system, stable control is possible compared to the conventional method, and according to the stable control, energy efficiency can be increased, the system can be stabilized, and discomfort due to irregular and frequent noise and rapid temperature change can be alleviated to people located in the space to be air-conditioned.

Figure 10:
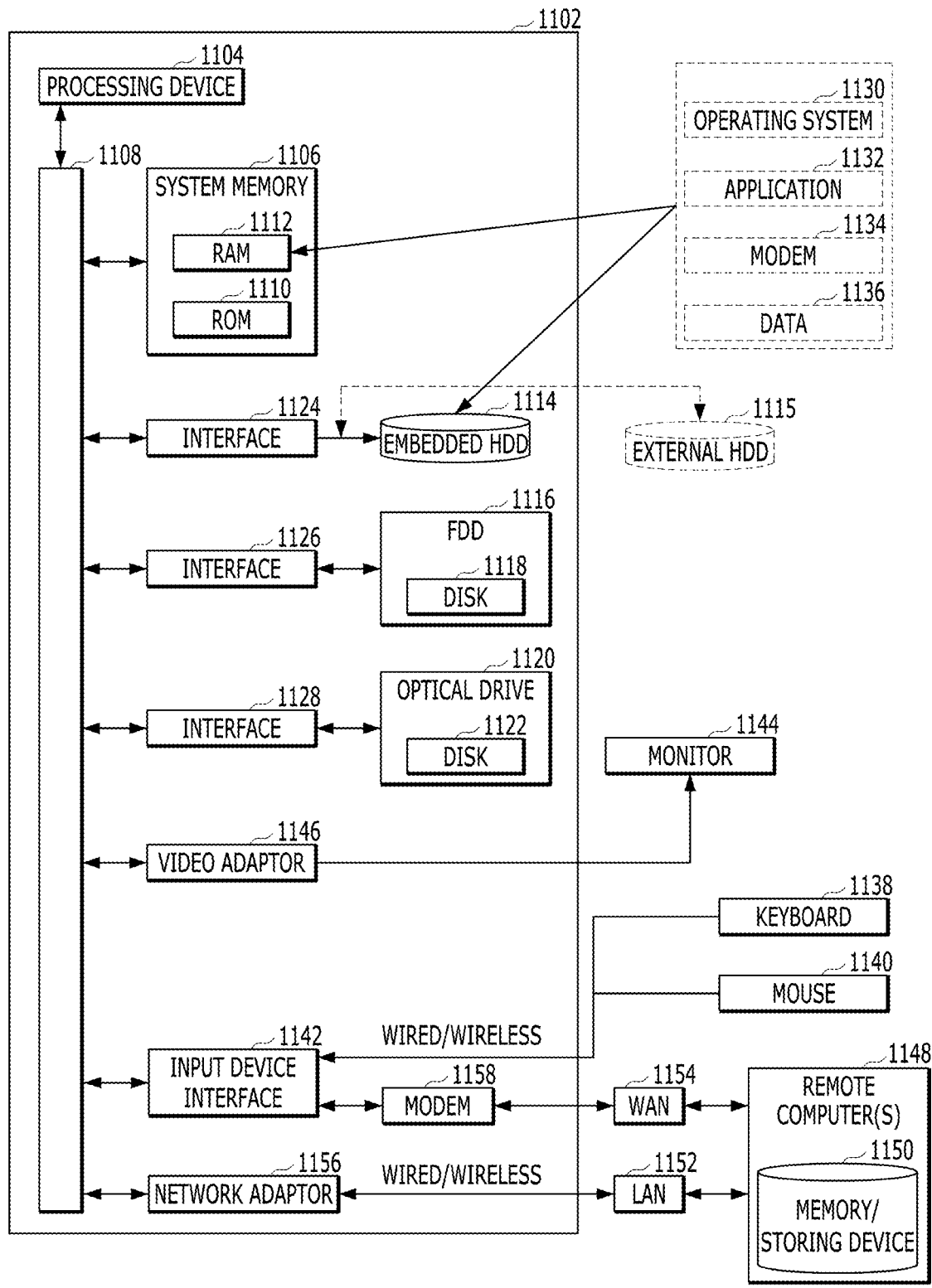
FIG. 10 is a simple and normal schematic view of an exemplary computing environment in which the exemplary embodiments of the present disclosure may be implemented.

FIG. 10 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)-a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive 1115 includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

What is claimed is:

1. A method for controlling an air conditioning device, performed by a computing device, the method comprising:
  determining a control action for the air conditioning device at a first time point by using a reinforcement learning agent, wherein the control action is used to control the air conditioning device, and wherein the air conditioning device includes a heating, ventilation, and air conditioning (HVAC) system or a thermal management system;
  determining a reward for the control action at the first time point based on a delay time by using the reinforcement learning agent, wherein the delay time corresponds to a time for a target temperature to be reached using the air conditioning device, and wherein determining the reward for the control action at the first time point is based on an assumption that the control action for the air conditioning device at the first time point is maintained to a third time point; and
  performing reinforcement learning related to the control of the air conditioning device based on the determined reward, wherein a time point when the delay time elapses from the first time point corresponds to a second time point, and
wherein the reward for the control action at the first time point is calculated while excluding situations after the first time point and before the second time point, and
generating a control signal to control the air conditioning device based on the control action.

2. The method of claim 1, wherein the third time point is (i) equal to the second time point or (ii) a time point later than the second time point.

3. The method of claim 2, wherein the determining of the reward for the control action at the first time point when the third time point is equal to the delay time includes:
determining the reward for the control action at the first time point based on a situation at the second time point without considering the situations after the first time point and before the second time point.

4. The method of claim 2, wherein the determining of the reward for the control action at the first time point when the third time point is longer than the delay time includes:
determining the reward for the control action at the first time point based on situations at the second to third time points without considering the situations after the first time point and before the second time point.

5. The method of claim 4, wherein the determining of the reward for the control action at the first time point based on the situations at the second to third time points includes:
calculating rewards considering situations of time points included in the second time point to third time point,
calculating a representative value of the calculated rewards, and
determining the representative value as the reward for the control action at the first time point.

6. The method of claim 1, wherein the control action includes at least one of: a control action for a compressor RPM value, a control action for a valve opening amount, a control action for a heating amount of a cooling water heater, a control action for a condenser, a control action for an evaporator, a control action for a radiator, a control action for an accumulator, a control action for a chiller, a control action for an outdoor heat exchanger, and a control action for an air purifying device, or a control action for a waste heat recovery device.

7. The method of claim 6, wherein the reward is calculated based on internal situation information of the HVAC system or the thermal management system, and
wherein the internal situation information includes at least one of: compressor information, condenser information, evaporator information, valve opening amount information, heater information, waste heat recovery information, temperature information, humidity information, air cleanliness information, or air flow information.

8. An apparatus comprising:
at least one processor; and
a memory,
wherein the processor is configured to:
determine a control action for the air conditioning device at a first time point by using a reinforcement learning agent, wherein the control action is used to control the air conditioning device, and wherein the air conditioning device includes a heating, ventilation, and air conditioning (HVAC) system or a thermal management system,
determine a reward for the control action at the first time point based on a delay time by using the reinforcement learning agent, wherein the delay time corresponds to a time for a target temperature to be reached using the air conditioning device, and wherein determining the reward for the control action at the first time point is based on an assumption that the control action for the air conditioning device at the first time point is maintained to a third time point, and
perform reinforcement learning related to the control of the air conditioning device based on the determined reward,
wherein a time point when the delay time elapses from the first time point corresponds to a second time point, and
wherein the reward for the control action at the first time point is calculated while excluding situations after the first time point and before the second time point, and
generating a control signal to directly control the air conditioning device based on the control action.

9. A non-transitory computer readable storage medium storing a computer program, wherein the computer program performs operations for controlling an air conditioning device when executed by one or more processors included in a computing device, the operations comprising:
an operation of determining a control action for the air conditioning device at a first time point by using a reinforcement learning agent, wherein the control action is used to control the air conditioning device, and wherein the air conditioning device includes a heating, ventilation, and air conditioning (HVAC) system or a thermal management system;
an operation of determining a reward for the control action at the first time point based on a delay time by using the reinforcement learning agent, wherein the delay time corresponds to a time for a target temperature to be reached using the air conditioning device, and wherein determining the reward for the control action at the first time point is based on an assumption that the control action for the air conditioning device at the first time point is maintained to a third time point; and
an operation of performing reinforcement learning related to the control of the air conditioning device based on the determined reward,
wherein a time point when the delay time elapses from the first time point corresponds to a second time point, and
wherein the reward for the control action at the first time point is calculated while excluding situations after the first time point and before the second time point, and
generating a control signal to control the air conditioning device based on the control action.

* * * * *